United States Patent [19]
Macey

[11] Patent Number: 5,220,132
[45] Date of Patent: Jun. 15, 1993

[54] ELECTRICAL INSULATION APPARATUS

[75] Inventor: Laurence D. Macey, Warners Bay, Australia

[73] Assignee: Crouse-Hinds (Australia) Pty Ltd., Regents Park, Australia

[21] Appl. No.: 682,057

[22] Filed: Apr. 5, 1991

[30] Foreign Application Priority Data

Apr. 5, 1990 [AU] Australia ................................ PJ9495

[51] Int. Cl.⁵ ............................................. H02G 3/22
[52] U.S. Cl. ................................................. 174/65 SS
[58] Field of Search ................................ 174/65 SS, 78

[56] References Cited

U.S. PATENT DOCUMENTS

| | | | |
|---|---|---|---|
| 2,355,403 | 8/1944 | Tripp | 174/65 SS |
| 3,649,054 | 3/1972 | McClenan | 174/65 SS |
| 3,697,089 | 10/1972 | Jacisin et al. | 174/65 SS |
| 3,744,008 | 7/1973 | Castellani | 174/65 SS |
| 3,833,754 | 9/1974 | Philibert | 174/65 SS |

FOREIGN PATENT DOCUMENTS

| | | | |
|---|---|---|---|
| 2532666 | 2/1977 | Fed. Rep. of Germany | 174/65 SS |
| 635148 | 3/1928 | France | 174/65 SS |
| 2219697 | 12/1989 | United Kingdom | 174/65 SS |

*Primary Examiner*—Leo P. Picard
*Assistant Examiner*—David A. Tone
*Attorney, Agent, or Firm*—Townsend and Townsend Khourie and Crew

[57] ABSTRACT

Electrical insulation apparatus namely a water resistant gland for the protected connection at an electrical cable. The gland is shaped for location around an electrical cable and includes a moisture impervious outer body and a pair of annular grommets located within the outer body. The grommets are arranged to contact and surround the cable. The grommets are of resilient material such as neoprene and include steel plates of annular construction located at either end of the neoprene body. A mechanism is provided to force the grommets into contact either with each other or with a cable protective armoring portion located between the grommets.

9 Claims, 4 Drawing Sheets

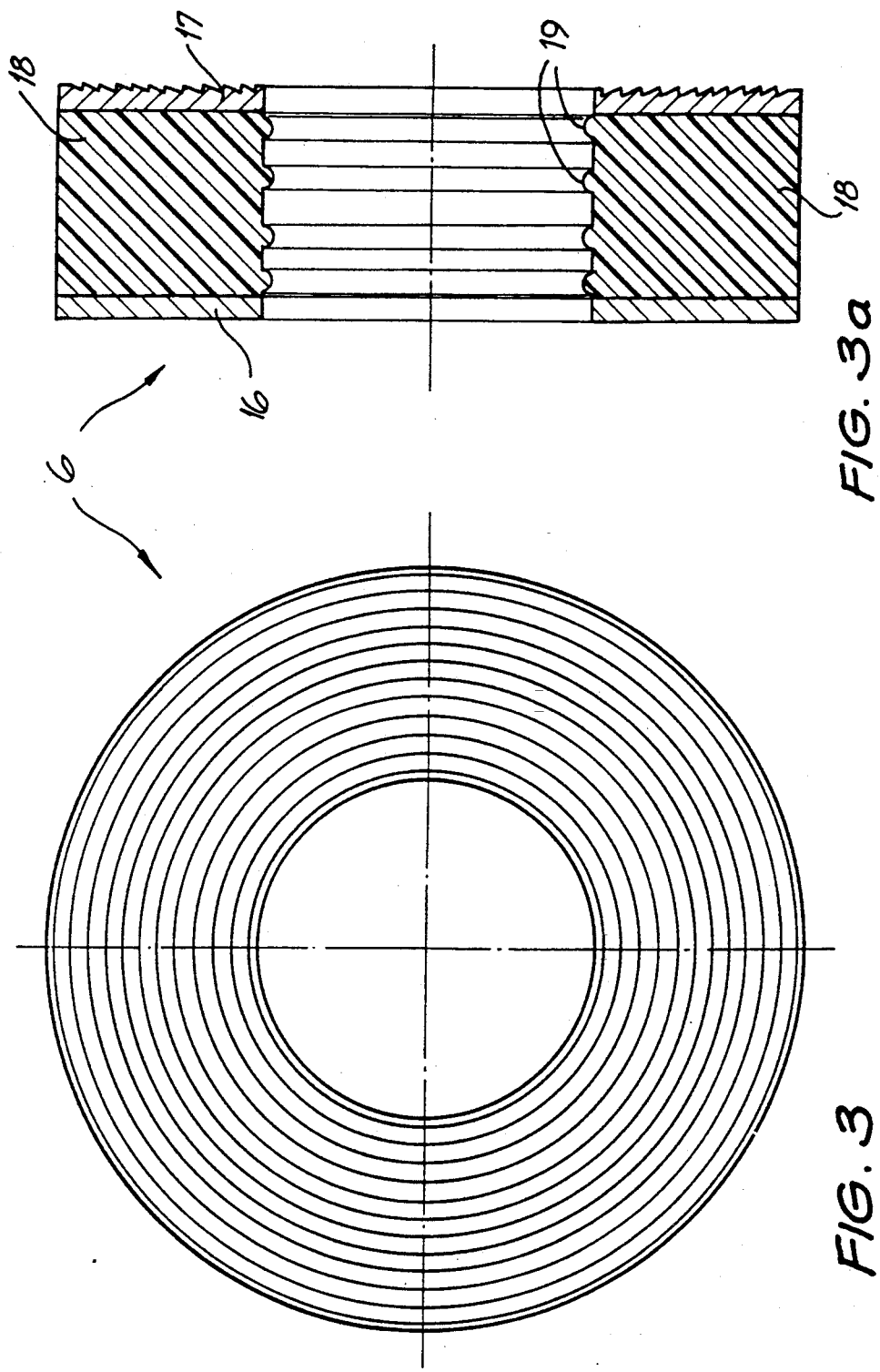

ELECTRICAL INSULATION APPARATUS

This invention relates to an electrical cable connection apparatus and more particularly to a water resistant gland for the protected connection of a cable.

The use of electricity is incompatible with moisture. If moisture of any description particularly water vapour or water itself should come into contact with wires adapted to carry electricity, short circuiting results and the consequences may be fire, explosion and perhaps death of persons in the vicinity. Particularly is this so in underground mining operations which are conducted in a damp environment and where very substantial currents and/or voltages are utilized.

Various methods for prevention of moisture incursion into electrical wiring have been proposed in the past but each has had its deficiencies. There is a considerable need for a gland which may be relied upon to prevent ingress of moisture to the wiring of electrical cables and into the interstices of the cable itself.

It is an object of this invention to provide a water (or other moisture) resistant gland which may be relied upon to prevent ingress of moisture to electrical wiring in conventional wiring arrangements.

This invention in one broad form provides a water (or other moisture) resistant gland adapted for location around an electrical cable, said gland comprising a solid moisture impervious outer body, a pair of substantially annular grommets located within said body and adapted to contact and surround an electrical cable, and means for forcing said grommets into contact either with each other or with a cable protective armouring portion located between said grommets.

It is preferred that the grommets be formed of resilient material and neoprene is one of the most preferred materials.

The outside body should be adapted for connection to the transformer cover, or other apparatus in relation to which the gland of this invention is utilized. For example, the outside body may be provided with a flange through which a series of screws might be located to connect the flange to a transformer connection box cover. Alternatively the flange may be of steel adapted to be welded to such transformer connection box cover. Again the body may not be provided with a flange but merely with a threaded outside bore adapted to be screwed into the device to which the cable is introduced through the gland.

Where the gland of this invention is utilized with high voltage three phase cabling earthing terminals may be provided for each of the earth screens surrounding the three phase cables.

The preferred means of forcing the grommets either together or into contact with the aforesaid cable protective armoring, resides in the provision of a grommet pressure plate at the end of the body portion of the gland opposite from the end thereof adapted for attachment to the transformer cover or other apparatus to which the gland must be attached. The body preferably incorporates an internally threaded female portion into which a series of screws, inserted through the peripheral portion of the grommet pressure plate, may be screwed to tighten the pressure plate against the end gland. The pressure plate may be provided with a plurality of filling apertures. These apertures might be filled with a compound such as silicon rubber, or pitch, or other approved filling compound.

By way of example only, one embodiment of apparatus according to this invention will now be described with reference to the accompanying drawings wherein:

FIG. 3 is an end view of the grommet depicted at 6 in FIG. 1;

FIG. 3a is a section of the grommet depicted at 6 in FIG. 1;

Figure 1:
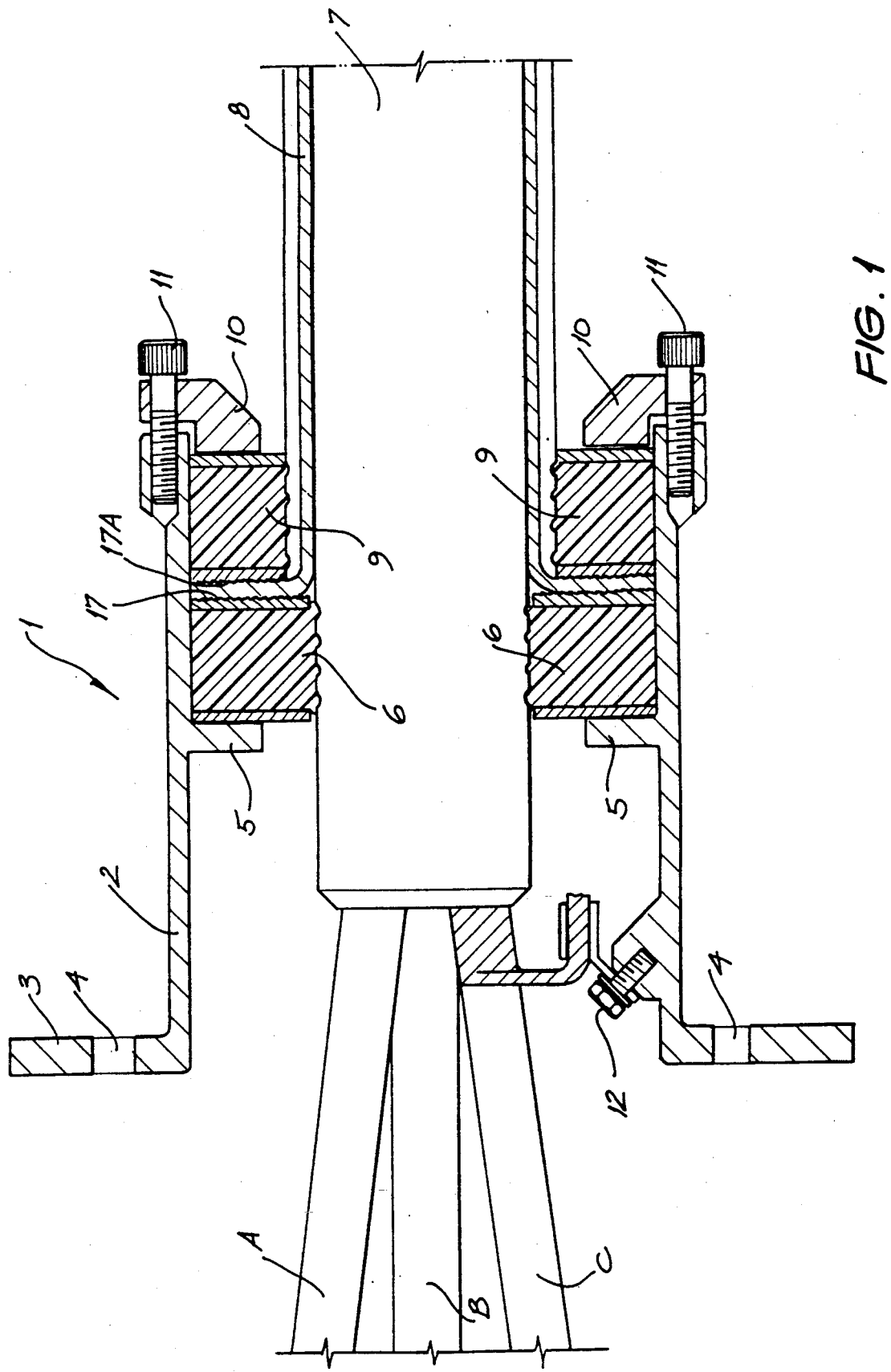
FIG. 1 is a section of a typical assembly of a gland according to this invention disposed on a three phase electrical cable.
Figure 2A:
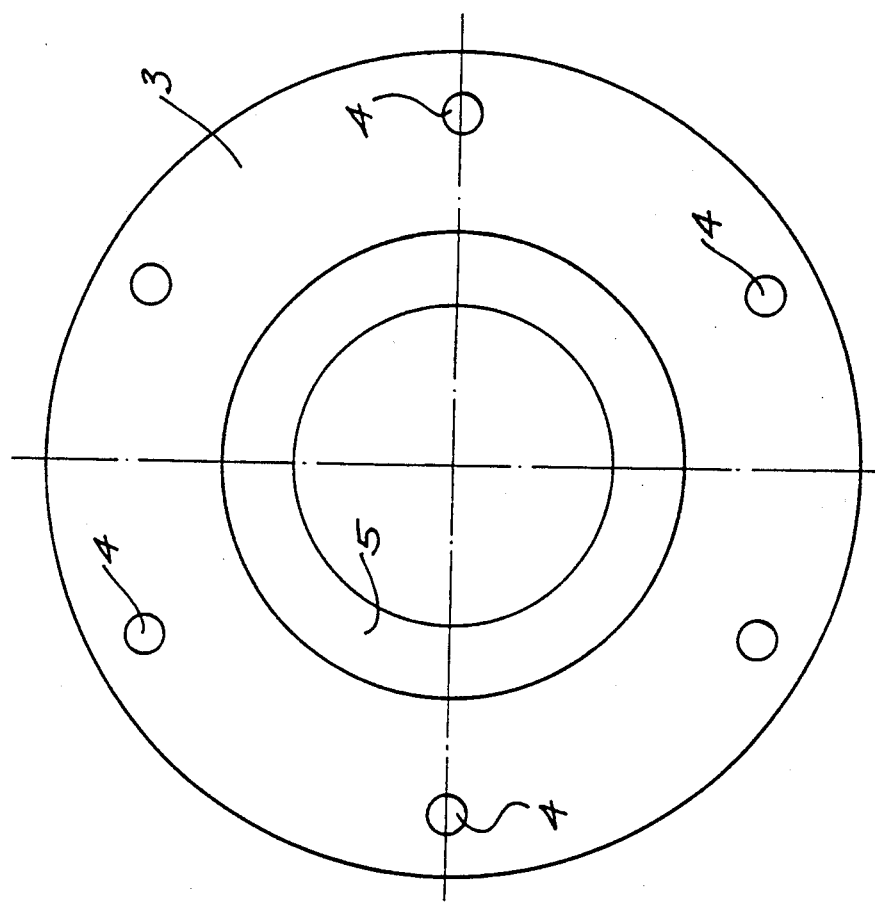
FIG. 2a is an end view of the device of FIG. 2 taken from the left-hand side thereof.
Figure 2:
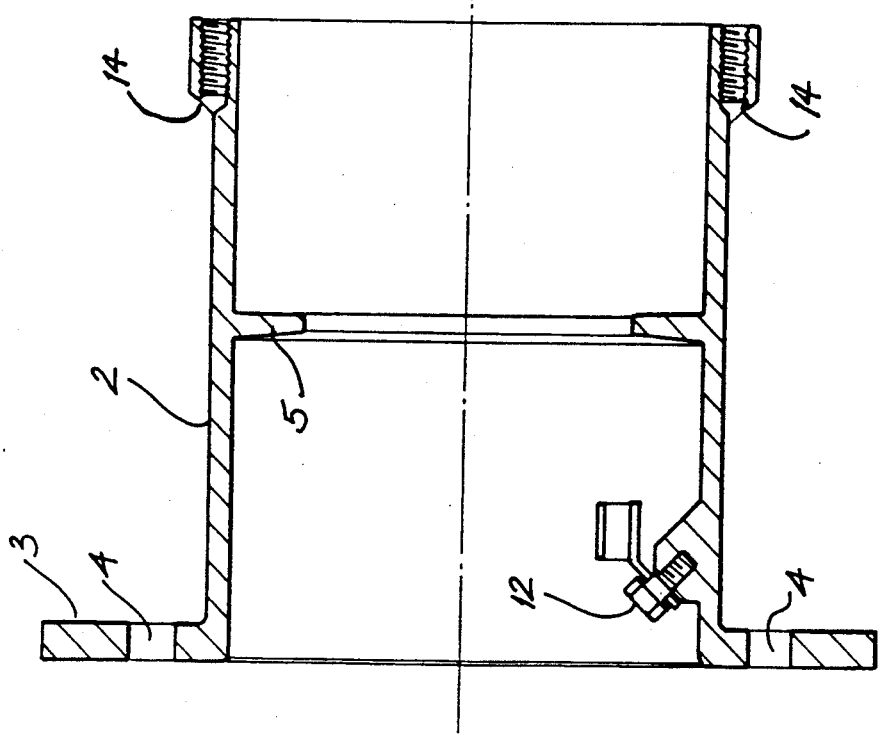
FIG. 2 is a section of the body of the gland of FIG. 1 depicted in relation to its mounting flange.
Figure 4B:
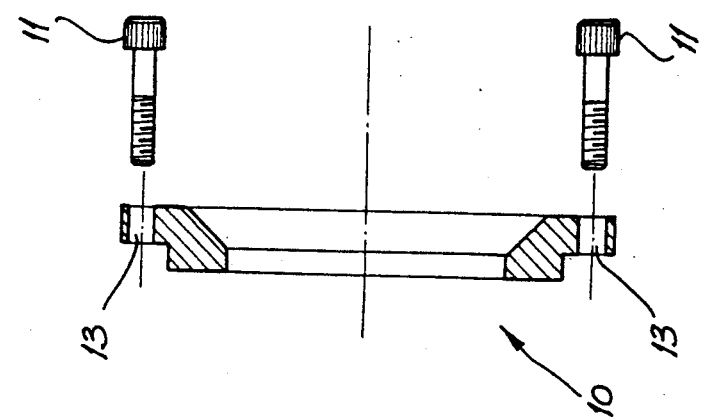
FIG. 4b is a section view of the grommet pressure plate 10 of FIG. 1.
Figure 4A:
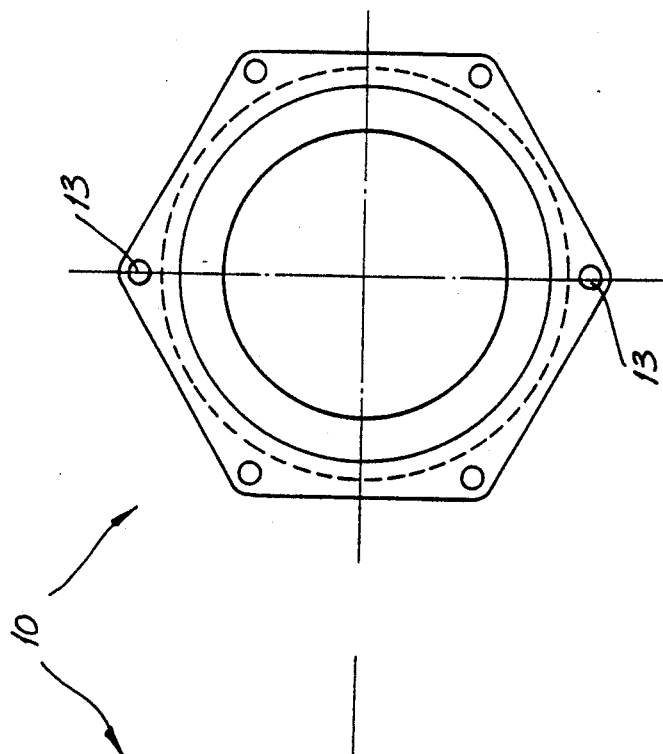
FIG. 4a is an end view of grommet pressure plate 10 as seen from the left-hand side of FIG. 1.
Figure 4:
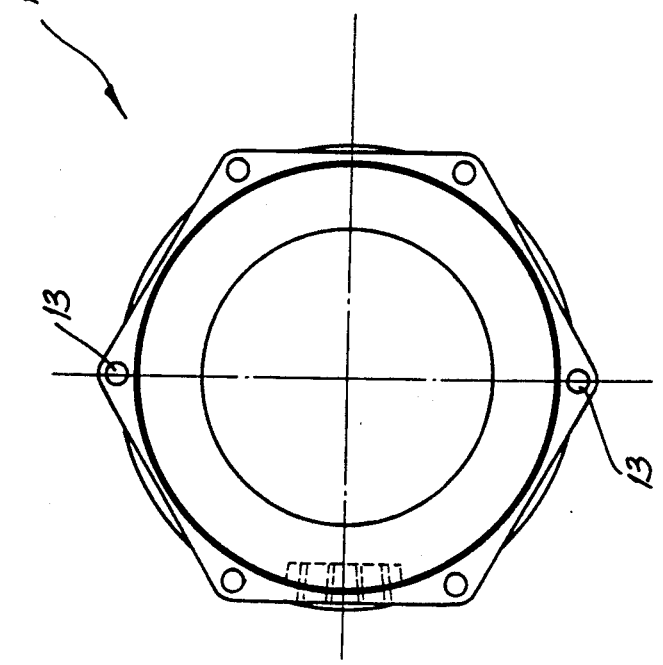
FIG. 4 is an end view of grommet pressure plate 10 as seen from the right-hand side of FIG. 1.

In the drawings, gland shown generally at 1 comprises impervious body portion 2, preferably of metal such as bronze. Body 2 is provided, in this embodiment, with a mounting flange 3 through apertures 4 of which screws may be inserted to mount gland 1 to the body of a transformer or the like.

Body 2 includes annular rib 5 against which first grommet 6 is disposed. In this embodiment, gland 1 is shown disposed around three phase cable 7, the protective armoring of which is stripped from cable 7 and clamped between first annular flange 6 and second annular flange 9.

Grommet pressure plate 10 is located at the rear of body 2 and screws 11 are provided to force pressure plate 10 against grommet 9 until gland 1 is secured in moisture proof manner around cable 7.

Earthing terminals 12 are provided in conjunction with this embodiment of gland 1, there being one earthing terminal for each of the three phase cables A, B, and C.

Screws 11 are inserted through apertures 13 in grommet pressure plate 10 and into suitably threaded female receptacles 14 in body 2 of gland 1.

Grommets 6 and 9 comprise steel plate outer members 16 and 17 between which are located neoprene members 18. Steel plate 17 is notched as is complementary steel plate 17A of grommet 9. Both grommets 6 and 9 are provided with neoprene ridges 19 to grip and seal the outer surface of cable 7.

It will be appreciated that, in the embodiment depicted and described herein, grommet 9 is of slightly greater internal radius than grommet 6 in order that cable protective armoring 8 and its outer cover might be accommodated. However, where a gland of this invention is utilized with cable which does not incorporate an outer protective armoring, grommets 6 and 9 will be of identical inner and outer radius.

It will be appreciated that a gland in accordance with this invention might be provided in such dimensions as to accommodate cables from 20 mm to 200 mm outside diameter. Further, the mounting flange attachment system may be varied in size or format to suit various applications.

What I claim is:

1. A gland for use with an electrical cable having an outer protective sheath, a cable inner protective wall, and a metallic armoring layer between said sheath and the inner protective wall, said gland comprising:

a first annular grommet including a plurality of first grommet internal ridges adapted to grip and seal said protective sheath, a second annular grommet of smaller internal diameter than said first grommet and having a plurality of second grommet internal ridges adapted to grip and seal the cable inner protective wall, each of said first and second grommets having a pair of axial annular end plates of steel to which the material of the grommet is molded, the first and second grommets being adapted for location therebetween of cable armoring, the grommet steel end plates adapted to be disposed in contact with said armoring being notched for secure gripping of said armoring;

a solid cylindrical moisture impervious cast metal outer body within which said grommets are secured and including an annular skirt depending from said cast metal outer body, said second grommet being located against the annular skirt; and a grommet pressure plate located against the steel axial end plate of the first grommet remote from said annular skirt, and means for securing the pressure plate against said first grommet and to force said grommets into contact either with each other or with said cable armoring.

2. A gland as defined in claim 1 wherein said means for securing the pressure plate against said first grommet comprises:

a plurality of internally threaded recesses provided in the outer body;

a plurality of screws; and a corresponding plurality of holes provided in the peripheral portion of the grommet pressure plate;

wherein the screws are adapted to be inserted through the plurality of holes and mate with the internal threads provided in the recesses for allowing the pressure plate to apply pressure to the grommets when the screws are tightened.

3. A gland as claimed in claim 2, wherein the pressure plate is provided with a plurality of filling apertures, said filling apertures being adapted to be filled with a plastically deformable, hardenable compound.

4. A gland as claimed in claim 1, wherein the body includes earthing terminals, said earthing terminals being adapted to be attached to earth screens provided in the cable.

5. A gland as claimed in claim 1, wherein the grommets are formed of resilient material.

6. A gland as claimed in claim 1, wherein said grommets are formed of neoprene.

7. A gland as claimed in claim 1, wherein the outer body is provided with a flange, said flange including a plurality of holes, said holes being adapted to allow the flange to be fastened to an apparatus which receives the cable by means of screws.

8. A gland as claimed in claim 1, wherein the outer body is provided with a flange, said flange being adapted to be welded to an apparatus which receives the cable from the gland.

9. A gland as claimed in claim 1, wherein the gland is provided with a threaded outside bore, said threaded outside bore being adapted to be screwed into a corresponding threaded recess provided in a device which receives the cable from the gland.

* * * * *